July 3, 1956

D. KASAK 2,752,899

DUAL FURNACE AND STEAM TEMPERATURE CONTROL THEREFOR

Filed Dec. 30, 1952

INVENTOR
David Kasak

BY
R. J. Bryant
ATTORNEY

United States Patent Office 2,752,899
Patented July 3, 1956

2,752,899

DUAL FURNACE AND STEAM TEMPERATURE CONTROL THEREFOR

David Kasak, Bronx, N. Y., assignor to Combustion Engineering, Inc., New York, N. Y., a corporation of Delaware Application December 30, 1952, Serial No. 328,697

10 Claims. (Cl. 122—479)

My invention relates to steam generators provided with dual furnaces and has specific reference to such a generator having separate control means for each of the furnace compartments.

It is the general object of my invention to provide a steam generator having a dual furnace with a new and novel control organization.

It is a more specific object of my invention to provide a steam generator having a dual furnace with separate control means for each of the furnace compartments organized to ensure against overheating of the heat exchange elements positioned in the gas pass of the generator.

It is a further object of my invention to provide a steam generator having a dual furnace with separate control means for each of the furnace compartments organized to regulate the steam temperature of the generator.

Other and further objects of my invention will become apparent to those skilled in the art as the description proceeds.

With the aforementioned objects in view my invention comprises an arrangement, construction and combination of the elements of the steam generator in such a manner as to attain the results desired as hereafter more particularly set forth in the following detailed description of an illustrative embodiment; said embodiment being shown by the accompanying drawings wherein.

Figure 1:
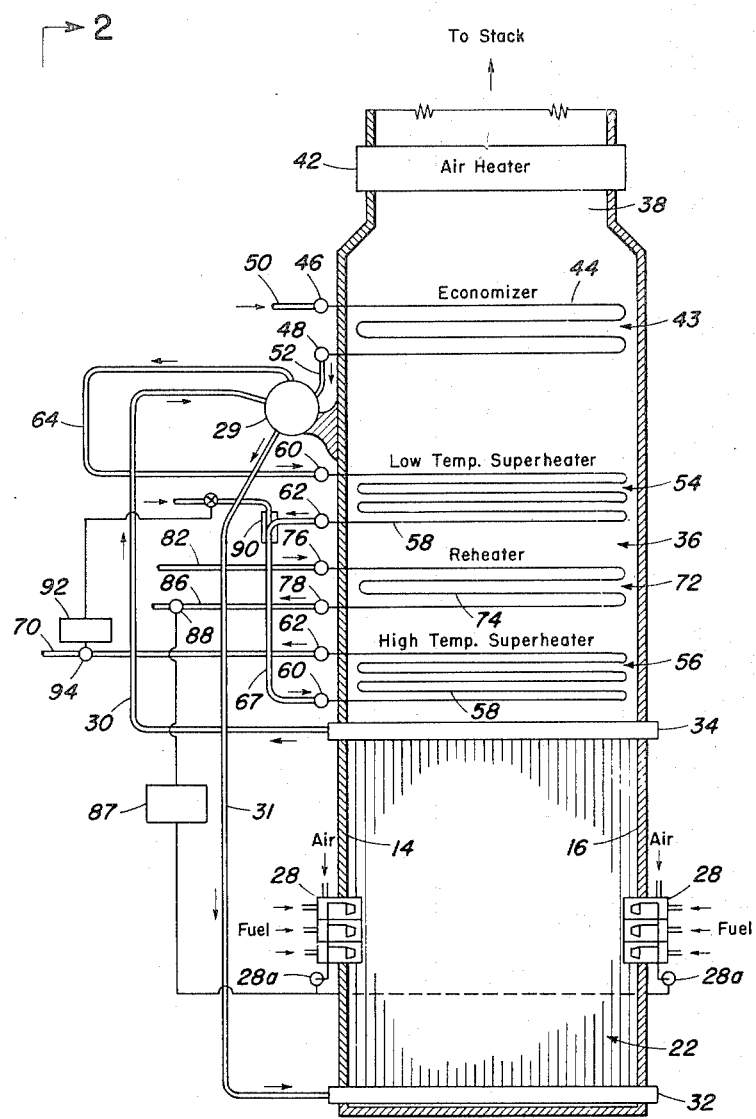
Fig. 1 is a schematic side view, partly in section, of a steam generator embodying my invention.

In recent years utilities have required steam generators of extremely large capacities due to the fact that efficiency demands that each turbine be served by a single steam generator and the utilities are resorting to turbines of seemingly ever increasing capacity. In designing these modern high capacity steam generators, which of course are provided with water wall furnaces, one of the primary factors that must be considered is the ratio of projected wall surface of the furnace to the volume of the furnace, since this ratio must be maintained within predetermined limits in order to have an efficiently operating unit.

In order to maintain this ratio within said predetermined limits for extremely large capacity generators it has been necessary to provide the furnaces of these generators with center division walls effectively dividing the furnace into two separate compartments. While this has solved the problem relative to the ratio of "projected wall area to volume" it has created an additional problem in control of the unit since with a single control it is virtually impossible to maintain the heat liberation in the two furnace compartments in balance resulting in unequal heating of heat exchangers which extend across the gas pass of the generator with the portions that are subjected primarily to the gases from one compartment being at a considerably different temperature from those subjected primarily to the gases from the other furnace compartment.

Heretofore it has been the practice to convey the steam from adjacent the two ends of the superheater and reheater elements into suitable mixing chambers and then convey the steam from each of these mixing chambers via two conduits to the two inlets of the turbine for high pressure steam and the two inlets for low pressure reheat steam. The steam temperature in one of the two outlet conduits connected to the reheat mixing chamber was employed to control in unison tiltable burners positioned in the two furnace compartments or other suitable control means capable of maintaining this temperature constant.

This system was effective to control the steam temperature, at the expense of considerable piping and mixing chambers, but was ineffective to control overheating of heat exchange elements subjected primarily to the combustion gases from only one of the furnace compartments which, for any of a number of reasons such as slagging, unequal distribution of fuel and the like, may become extremely hot. Prior to my novel organization it was therefore possible to burn out superheater and reheater elements located in one side of the gas pass while elements of the same superheater or reheater located in the other side of the gas pass were relatively cool. There was no independent control of each furnace compartment but merely a unitary control of both compartments in response to the combined effect of the combustion gases issuing from the compartments. In accordance with my invention this condition is remedied.

The illustrative steam generator

Figure 3:
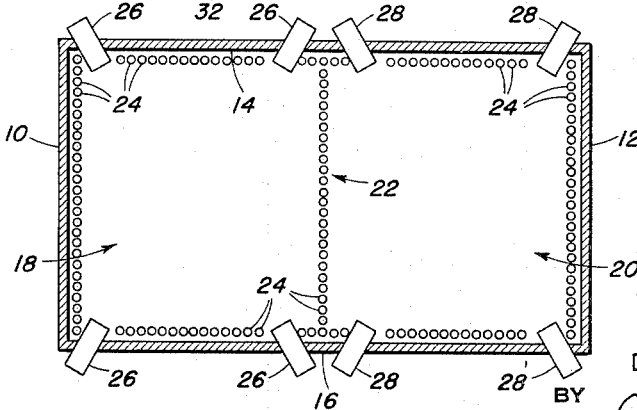
Fig. 3 is a sectional view taken generally along line 3—3 of Fig. 2 showing the disposition of the burners in each of the furnace compartments.

Referring now to the drawings, wherein like elements are identified with like reference characters throughout, the steam generator diagrammatically disclosed therein comprises a casing of generally rectangular transverse section (Fig. 3) made up of side walls 10 and 12, and front and rear walls 14 and 16, respectively. The lower portion of this casing houses the furnace which is divided into compartments 18 and 20 by center wall 22 and which has its outer walls lined with steam generating tubes 24 with center wall 22 being completely made up of said tubes 24. The furnace compartment 18 is tangentially fired in a well known manner through burner units 26 positioned adjacent the corners of the compartment while furnace compartment 20 is similarly fired through burner units 28. Each of the burner units is of the vertically tiltable type disclosed in detail in U. S. Patent 2,363,875 issued November 28, 1944, to H. Kreisinger et al.

The illustrative steam generator is provided with a steam and water drum 29 having downcomers 31 depending therefrom and uptakes 30 connected thereto. Said downcomers and uptakes are connected to the inlets and outlets of steam generating tubes 24 via headers 32 and 34, respectively, thereby forming a fluid circuit through which the boiler water circulates from drum 29 down through downcomers 31, up through tubes 24, where a portion of the water is evaporated to steam, and thence up through uptakes 30 back into the drum.

The outlets of furnace compartments 18 and 20 communicate directly with the common gas pass 36 through which the combustion gases generated in said compartments flow in passing from said compartments to the two outlet passages 38 and 40. Each of these passages is provided with an air heater 42 for preheating in a well known manner, the combustion supporting air supplied to the furnace.

Positioned within gas pass 36 in heat exchange relation with the combustion gases flowing therethrough are the economizer, superheater and reheater elements of the steam generator. The economizer generally designated 43 is illustratively shown as comprising numerous tubes 44 sinuously formed with each tube projecting across gas pass 36 in parallel relation to sides 10 and 12 of the casing and center wall 22 of the furnace. The tubes are arranged in a row across the width of gas pass 36 and have their inlets connected to the common inlet header 46 and their outlets connected to the common outlet header 48. Water is supplied to inlet header 46 through conduits 50 and is conveyed from outlet header 48 to drum 29 via conduits 52.

The superheater is divided into low temperature section 54 and high temperature section 56. Each of these sections is constructed generally similar to economizer 43 having sinuously formed tubes 58 projecting across gas pass 36 in parallel relation with said walls 10 and 12 and center wall 22 with the tubes arranged in a row extending across the width of the gas pass and having their inlet connected to common inlet headers 60 and their outlet to common outlet headers 62. Saturated steam is conveyed from drum 29 to inlet header 60 of low temperature section 54 via conduits 64. After passing through low temperature section 54 the steam leaves header 62 through conduits 66 and 67 and enters inlet header 60 of high temperature section 56 from which it passes through tubes 58 into outlet header 62 and then to the two high pressure inlets of the turbine via conduits 68 and 70.

Positioned intermediate the high and low temperature superheater sections is the reheater 72 which is also similar in construction to economizer 43 having sinuously formed tubes 74 extending across gas pass 36 in parallel relation with side walls 10 and 12 and center wall 22 and arranged in a row extending across the width of said gas pass. The inlet ends of tubes 74 are connected to inlet header 76 and the outlet ends are connected to outlet header 78. Steam bled from an intermediate stage of a turbine is admitted into inlet header 76 through conduits 80 and 82 and is conveyed from outlet header 78 to the two low pressure inlets of the turbine via conduits 84 and 86.

*The control organization*

In a steam generator organized in the manner just described it will be obvious that while there will be some mixing of the gases of combustion leaving each of the furnace compartments during their passage through common gas pass 36 the gases passing through the area of the gas pass corresponding in relative location to the area of each furnace compartment will be composed primarily of gases from the corresponding furnace compartment. Thus the tubes of the economizer, superheater and reheater positioned in these respective areas will be subjected primarily to combustion gases of said corresponding furnace compartments wherefore the temperature of the fluid leaving these tubes will be responsive to the heat content of the combustion gases leaving said corresponding furnace compartment, heat content being defined as the B. t. u./hr. of the combustion gases leaving a furnace.

In the illustrative embodiment shown in the drawings, in order for the temperature of the steam leaving the low temperature superheater section through conduit 67, the high temperature superheater section through conduit 70 and the reheater through conduit 86 to be responsive to the heat content of the gases of combustion leaving the furnace compartment 20, conduit 67 is disclosed as interconnecting the right ends (as viewed in Fig. 2) of outlet header 62 of the low temperature superheater section and inlet header 60 of the high temperature superheater section; conduit 70 is disclosed as connected to the right end of outlet header 62 of the high temperature superheater section; and conduit 86 is disclosed as connected to the right end of outlet header 78 of the reheater. Through this arrangement a majority, if not all, of the steam passing through conduits 67, 70 and 86, will pass through tubes positioned in the area of gas pass 36 corresponding in relative location to the area of furnace compartment 20, i. e., the right half of the gas pass as viewed in Fig. 2. The temperature of the steam passing through these conduits is therefore directly responsive to the heat content of the gases issuing from furnace compartment 20.

A similar arrangement is provided at the other end of the low temperature superheater section, the high temperature superheater section and the reheater so that the temperature of the steam flowing through conduits 66, 68 and 84, respectively connected to these elements, is directly responsive to the heat content of the combustion gases leaving furnace compartment 18.

Obviously the connection of the various conduits is not restricted to the end of the headers, the only requirement being that those connected to the right half of the various heat exchange devices be connected in a manner so that the vast majority of the steam they receive passes through the right half of the various heat exchangers and those connected to the left half be connected in a manner so that a vast majority of the steam they receive passes through the left half of said heat exchangers.

Figure 2:
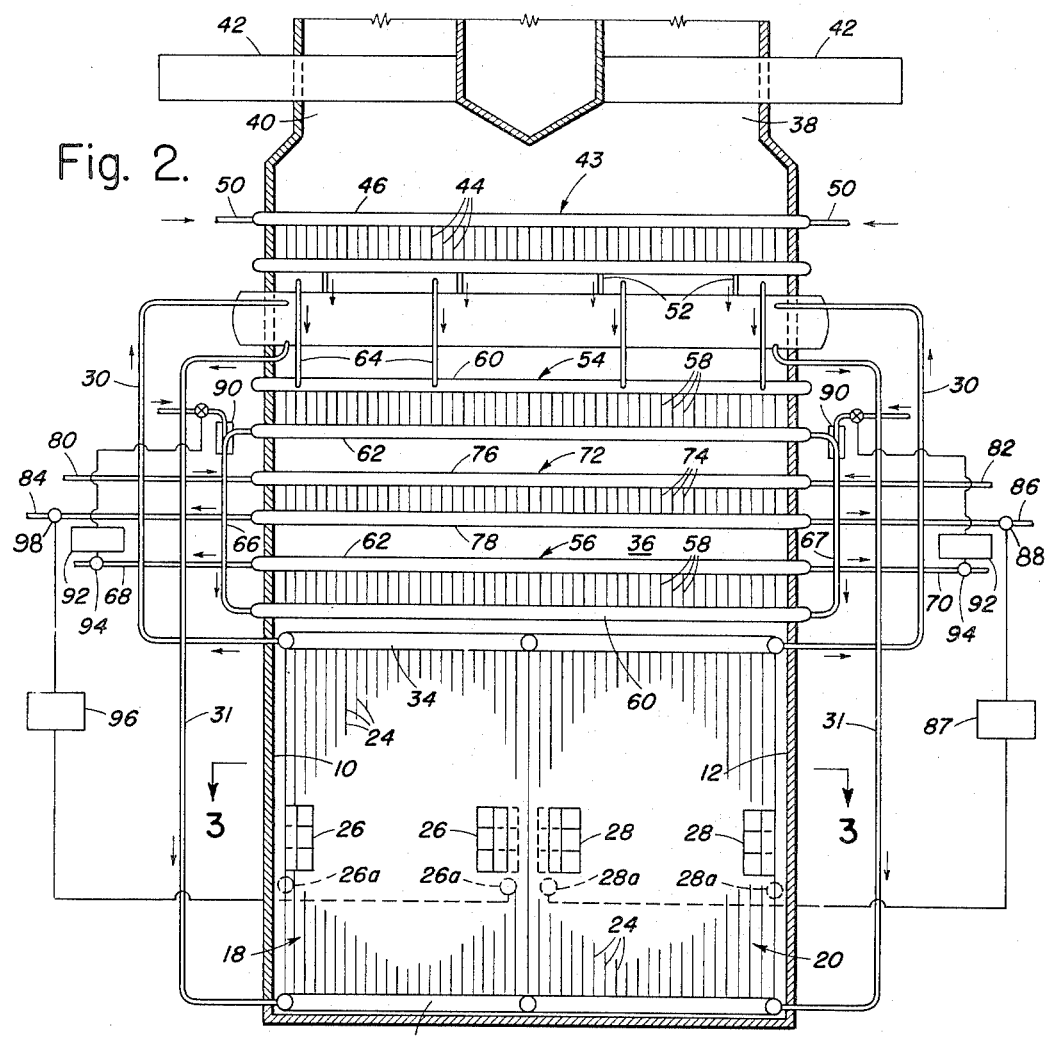
Fig. 2 is a front view taken from line 2—2 of Fig. 1, with the front wall of the steam generator removed, and showing the interconnection of the various heat exchange elements.

In order to control the temperature of the reheated steam passing through conduit 86 suitable controls are provided to regulate the rate of heat absorption of the reheater tubes located in the right half of the gas pass as viewed in Fig. 2 i. e., the area of the gas pass 36 which the gases issuing from furnace chamber 20 predominate. As illustratively disclosed this control comprises electrical control mechanism 87, of any suitable form, operated by temperature responsive device 88 positioned in conduit 86. The control mechanism 87 is operatively connected with motors 28a of burner units 28 to adjust the tilt of the burners in a manner to maintain the temperature of the reheated steam substantially constant.

The control of the temperature of the reheated steam passing through conduit 84 is obtained through a similar control organization. Electrical control mechanism 96 is operatively connected with temperature responsive device 98 and with motors 26a of burner units 26 to control the tilt of said burner units in a manner to maintain said temperature constant.

Since the superheated steam temperature is generally above its control point when the reheat steam temperature is at its desired value desuperheaters 90 are positioned in conduits 66 and 67 and are operable to control the steam temperature in conduits 68 and 70 respectively, through electrical control mechanism 92 and temperature responsive means 94 responsive to the respective steam temperature in said conduits 68 and 70.

While I have disclosed tilting burners for controlling the reheat temperature this is merely by way of illustration and is not to be taken as restrictive, it being obvious that other well known forms of controls may be equally well employed, as for example, the gas recirculation or excess air type of control. In this connection it should be noted that all three of these control systems derive their control essentially by regulating the B. t. u./hr. of the gases issuing from a furnace, previously identified herein as the heat content.

*Summary*

From the foregoing it will be seen that I have provided a steam generator having a dual furnace with separate means for controlling each furnace in a manner to insure against overheating the heat exchange elements positioned in the gas pass of the generator and that I have provided means for controlling the temperature of steam taken from spaced locations on a heat exchanger positioned in the gas pass of the generator without the necessity of mixing the steam taken from these locations.

While I have illustrated and described a preferred embodiment of my novel control organization it is to be understood that such is merely illustrative and not restrictive and that variations and modifications may be made therein without departing from the spirit and scope of the invention. I therefore do not wish to be limited to the precise details set forth but desire to avail myself of such changes and alterations as fall within the purview of my invention.

What I claim is:

1. A heat exchanger of the type described comprising a furnace divided into a plurality of compartments, means for supplying fuel to each of said compartments, a common gas pass into which the outlets of said compartments lead, said gas pass receiving the hot combustion gases issuing from the compartments, vapor heating means including tubes extending into said gas pass with a majority of said tubes constructed and arranged so that a particular tube of said majority is subjected primarily to the hot gases issuing from only one of the furnace compartments, means for supplying vapor to said tubes and receiving vapor from said tubes, separate means responsive to the temperature of the vapor issuing from separate groups of said tubes each group being composed essentially of tubes subjected primarily to the hot gases issuing from only one of the furnace compartments with different groups being subjected to the hot gases of different furnace compartments, and individual means for controlling the heat content of the gases leaving the several furnace compartments, the control for each compartment being independent and being regulated by the means responsive to the temperature of the vapor issuing from the corresponding group of tubes to maintain this temperature substantially constant.

2. A heat exchanger of the type described comprising a furnace divided into a plurality of compartments, means for supplying fuel to each of said compartments, a common gas pass into which the outlets of said compartments lead, said gas pass receiving the hot combustion gases issuing from the compartments, vapor heating means including tubes extending into said gas pass with a majority of said tubes being constructed and arranged so that a particular tube of said majority is subjected primarily to the hot gases issuing from only one of the furnace compartments, means for supplying vapor to said tubes and receiving vapor from said tubes, separate means responsive to the temperature of the vapor issuing from separate groups of said tubes, each group being composed essentially of tubes subjected primarily to the hot gases issuing from only one of the furnace compartments with different groups being subjected to the hot gases of different furnace compartments, and individual means operable to individually control the heat absorption rate of each of the groups of tubes, said individual control means being regulated by the means responsive to the temperature of the vapor issuing from the corresponding group of tubes to maintain said temperature substantially constant.

3. A heat exchanger of the type described comprising a water walled furnace divided into a plurality of compartments, means for supplying fuel to each of said compartments, a common gas pass into which the outlets of said compartments lead, said gas pass receiving the hot combustion gases issuing from the compartments, vapor heating means including tubes extending into said gas pass with a majority of said tubes constructed and arranged so that a particular tube of said majority is subjected primarily to the hot gases issuing from only one of the furnace compartments, means for supplying fluid to said tubes and receiving vapor from said tubes, separate means responsive to the temperature of the vapor issuing from separate groups of said tubes each group being composed essentially of tubes subjected primarily to the hot gases issuing from only one of the furnace compartments with different groups being subjected to the hot gases of different furnace compartments, and means to individually control the temperature of the gases leaving each of the furnace compartments, said control means for each compartment being regulated by the means responsive to the temperature of the vapor issuing from the group of tubes subjected to the hot gases issuing from the corresponding compartment and being operable to maintain this temperature substantially constant.

4. In a steam generator the combination of a furnace of rectangular transverse section having at least one division wall interposed between one pair of opposed walls in substantially parallel relation with the other walls and dividing the furnace into compartments, said compartments having outlets adjacent one end of the furnace, means for supplying fuel to each of the compartments, a common gas pass communicating directly with the outlets of the compartments for receiving the hot combustion gases generated in each of the compartments and so arranged that the gases from each furnace compartment passing therethrough are substantially unmixed, steam heating means positioned in said gas pass and including tubes disposed in spaced parallel planes that are substantially parallel with said division wall, said tubes being arranged in a row extending transversely of the gas pass, common header means for supplying steam to said tubes, common header means for receiving steam from said tubes, individual means responsive to the temperature of the steam issuing generally from each group of tubes disposed in the area of the gas pass substantially corresponding with the area in direct communication with each of the compartments, and individual means operable to individually control the heat absorption rate of each of the groups of tubes, each of said control means being regulated by the temperature responsive means associated with the corresponding group of tubes to maintain the temperature of the steam issuing therefrom substantially constant.

5. The combination defined by claim 4 wherein the furnace is lined with fluid cooled tubes and the means for controlling the heat absorption rate of each group of steam heating tubes comprises burners disposed in each furnace compartment with the burners in each compartment being individually tiltable toward and away from the outlet of the compartment.

6. A steam generating unit comprising a generally vertical furnace of rectangular transverse section provided with a vertical division wall parallel with the minor transverse axis of the furnace and extending throughout a greater portion of the length of the furnace dividing the interior into two compartments, said furnace being provided adjacent its upper end with an outlet extending across the width of the furnace thereby communicating directly with the two compartments, separate means for supplying fuel to each of the compartments, means forming a common gas pass having an inlet area substantially equal to the area of the outlet of the furnace and into which said outlet leads, said furnace compartment outlets and said gas pass being so arranged that there is little mixing of the gases issuing from each compartment during passage thereof through the gas pass, said gas pass having separate outlets corresponding in relative location to the furnace compartments and within which separate air heaters are disposed, steam heating means positioned in said gas pass and including separate tubes projecting therewithin in parallel relation with the minor transverse axis of the furnace and being arranged in a row extending transversely of said gas pass, header means for supplying steam to said tubes, additional header means for receiving steam issuing from said tubes, means responsive to the temperature of the steam issuing primarily from the group of tubes positioned in the area of the gas pass corresponding generally to the area of said gas pass in direct communication with one of the furnace compartments, additional means responsive to the temperature of the steam issuing primarily from the group of tubes positioned in the area of the gas pass corresponding generally to the area of said gas pass in direct communication with the other furnace compartment, separate means operable to control the heat absorption rate of each group of tubes, said last named means being regulated by the temperature responsive means of the corresponding group to maintain the temperature of the steam leaving each group substantially constant.

7. In a steam generator of the type described, the combination of a generally vertical furnace of rectangular transverse section having the walls thereof lined with steam generating tubes, a vertical division wall comprising parallel steam generating tubes in side by side relation positioned within said furnace, said wall being in parallel relation with the minor transverse axis of the furnace and extending throughout substantially the entire length of the furnace dividing the interior thereof into two compartments, said furnace being provided adjacent its upper end with an outlet extending across the width of the furnace in direct communication with the two compartments, separate burner means for supplying fuel to each of the compartments, said burner means being independently vertically tiltable toward and away from the furnace outlet, means forming a gas pass having an inlet area corresponding to the area of the outlet of the furnace and into which the outlet leads, said gas pass being so arranged that the gases from each furnace compartment passing therethrough are substantially unmixed steam heating means positioned in the gas pass and including separate tubes projecting thereinto in parallel relation with the minor axis of the furnace, said tubes being arranged in a row extending transversely of the gas pass, a common inlet header into which the inlets of said tubes are connected, a common outlet header into which the outlets of said tubes are connected, means responsive to the temperature of the steam issuing primarily from the tubes positioned in the area of the gas pass corresponding in relative location to the area of one of the furnace compartments whereby these tubes are subjected primarily to combustion gases generated in said one compartment, additional means responsive to the temperature of the steam issuing primarily from the tubes positioned in the area of the gas pass corresponding in relative location to the area of the other furnace compartment whereby these tubes are subjected primarily to the combustion gases generated in said other compartment, the temperature responsive means of each group being operable to regulate the tilt of the burners for the corresponding compartments to maintain the temperature of the steam issuing from each group substantially constant.

8. A steam generator comprising a pair of separate laterally adjacent furnace compartments fired with a suitable fuel and with each having steam generating means disposed therein, said compartments having combustion gas outlets communicating with a common gas pass, said outlets and gas pass being so disposed that there is little mixing of the combustion gases issuing from the two outlets during the passage of the gases through the gas pass, a steam heater disposed in said gas pass connected to receive steam generated in the steam generating means of both compartments and heat the same to a predetermined temperature, said steam heater comprising tubes extending into said gas pass in a manner so that a substantial number of the tubes comprising a first group are subjected primarily to the combustion gases issuing from only one of the furnace compartments while a substantial number comprising a second group are subjected primarily to combustion gases issuing from only the other furnace compartment, individual means responsive to the temperature of the steam respectively issuing generally from each of said groups of tubes, individual means operable to respectively control the heat absorption rate of each of the groups of tubes with each of said control means being regulated by the temperature responsive means associated with the corresponding group of tubes to maintain the temperature of the steam issuing therefrom substantially constant.

9. A steam generator as defined in claim 8 wherein the steam generating means in each furnace compartment are tubes lining the inner surface of the walls of the compartment.

10. A steam generator as defined in claim 9 wherein the individual control means are tiltable burners operable to controllably regulate the zone of combustion in each furnace compartment toward and away from the outlet thereof.

References Cited in the file of this patent

UNITED STATES PATENTS

| 1,775,336 | Wood | Sept. 9, 1930 |
| 2,034,717 | Duram | Mar. 24, 1936 |
| 2,121,537 | Coghill | June 21, 1938 |
| 2,245,209 | Mayo | June 10, 1941 |
| 2,298,700 | Junkins et al. | Oct. 13, 1942 |
| 2,334,187 | Fresch | Nov. 16, 1943 |
| 2,363,875 | Kreisinger et al. | Nov. 28, 1944 |
| 2,590,712 | Lacerenza | Mar. 25, 1952 |
| 2,649,079 | Van Brunt | Aug. 18, 1953 |